US007869308B2

(12) United States Patent
Rochat

(10) Patent No.: US 7,869,308 B2
(45) Date of Patent: Jan. 11, 2011

(54) DIVE WATCH

(75) Inventor: Marco Rochat, Le Brassus (CH)

(73) Assignee: Frédéric Piguet S.A., Le Brassus (CH)

( * ) Notice: Subject to any disclaimer, the term of this patent is extended or adjusted under 35 U.S.C. 154(b) by 245 days.

(21) Appl. No.: 12/298,655

(22) PCT Filed: Apr. 5, 2007

(86) PCT No.: PCT/CH2007/000173

§ 371 (c)(1),
(2), (4) Date: Oct. 27, 2008

(87) PCT Pub. No.: WO2007/121597

PCT Pub. Date: Nov. 1, 2007

(65) Prior Publication Data

US 2009/0185451 A1 Jul. 23, 2009

(30) Foreign Application Priority Data

Apr. 25, 2006 (EP) .................................. 06008493

(51) Int. Cl.
*G04B 47/06* (2006.01)
*G01F 23/00* (2006.01)
*G01L 7/00* (2006.01)

(52) U.S. Cl. ........................... 368/11; 368/80; 368/101; 73/744

(58) Field of Classification Search ................... 368/11, 368/80, 101; 73/291, 300, 384, 700, 744
See application file for complete search history.

(56) References Cited

U.S. PATENT DOCUMENTS 3,111,003 A * 11/1963 Droz ........................... 368/10
3,696,610 A * 10/1972 Charbonnier .................. 368/1
3,910,117 A 10/1975 Wicklund
6,385,134 B1 * 5/2002 Lange et al. .................. 368/11

(Continued)

FOREIGN PATENT DOCUMENTS

EP 0 682 301 A2 11/1995

(Continued)

OTHER PUBLICATIONS

International Search Report issued in corresponding application No. PCT/CH2007/000173, completed Aug. 21, 2007 and mailed Aug. 28, 2007.

*Primary Examiner*—Vit W Miska
(74) *Attorney, Agent, or Firm*—Griffin & Szipl, P.C.

(57) ABSTRACT

The invention concerns a mechanical or electromechanical dive watch including hour (4) and minute (6) hands, a pressure sensor (42), a depth indicator hand (14) and a depth variation indicator hand (22), the depth indicator hand (14) providing a diver with an indication of the instantaneous value of the depth at which he is situated when diving, the depth variation indicator hand (22) being at that moment locked at zero, the depth indicator hand (14) being locked in turn when the diver reaches a required decompression stop and the depth variation indicator hand (22) being released to indicate to the diver any variations in his depth relative to the decompression stop depth, the depth variation indicator hand (22) then being returned to zero and locked while the depth indicator hand (14) is released and again indicates the exact dive depth when the diver resumes his ascent towards the surface.

19 Claims, 4 Drawing Sheets

U.S. PATENT DOCUMENTS

| | | | | |
|---|---|---|---|---|
| 7,242,639 | B2 * | 7/2007 | Blondeau et al. | 368/11 |
| 7,269,100 | B2 * | 9/2007 | Gilomen | 368/11 |
| 7,623,415 | B2 * | 11/2009 | Raeber et al. | 368/11 |
| 7,778,115 | B2 * | 8/2010 | Ruchonnet | 368/11 |
| 2004/0047242 | A1 * | 3/2004 | Germiquet et al. | 368/11 |
| 2007/0183264 | A1 | 8/2007 | Raeber et al. | |

FOREIGN PATENT DOCUMENTS

| | | | |
|---|---|---|---|
| EP | 1 571 506 | A1 | 9/2005 |
| GB | 2 183 838 | A | 6/1987 |

* cited by examiner

DIVE WATCH

This is a National Phase Application in the United States of International Patent Application No. PCT/CH2007/000173 filed Apr. 5, 2007, which claims priority on European Patent Application No. 06008493.6 filed Apr. 25, 2006. The entire disclosures of the above patent applications are hereby incorporated by reference.

FIELD OF THE INVENTION

This invention concerns a dive watch that enables a diver to measure fluctuations in depth when he makes a decompression stop at a determined depth.

BACKGROUND OF THE INVENTION

A diver has to know various parameters when he makes an underwater dive in order to ensure his safety. In particular, the diver must be able to know instantaneously at what depth he is in order to avoid the risk of exceeding the pre-established maximum dive depth. The diver must also know his dive time to avoid exhausting his oxygen reserves and so that he can come back up to the surface in complete safety. Watches that provide a diver with information relating to his instantaneous depth and dive time are already known.

However, there is an additional parameter which, to the Applicant's knowledge, is not taken into account by dive watches available on the market. This parameter is linked to the stability of the diver's depth when he makes a decompression stop. Indeed, it is known that the body absorbs the nitrogen contained in the air breathed in by divers, in particular into the bloodstream, in a proportion that increases with the ambient pressure and duration of immersion. It is imperative for this nitrogen to be eliminated by the body before the diver returns to the open air. If the nitrogen is not eliminated, the diver runs a risk of serious danger, or even death. The problem of eliminating nitrogen has been solved by requiring divers to observe very slow ascent speeds to the surface and, especially, to make decompression stops at certain depths. During these decompression stops, the difference that exists between the ambient pressure and the blood pressure causes nitrogen dissolved in the blood to pass outside the body. By observing these decompression stops, the diver thus gradually succeeds in eliminating the nitrogen dissolved in his blood. However, nitrogen is eliminated all the more efficiently if the diver succeeds in remaining at a stable depth in the decompression stop that he is making. There therefore exists a need in the state of the art for a watch that can indicate depth fluctuations to the diver when he is making a decompression stop.

It is an object of this invention to respond to this requirement by providing a mechanical or electromechanical dive watch including hour and minute hands, this watch being characterized in that it further includes a depth indicator hand and a depth variation indicator hand, the depth indicator hand providing the diver with an instantaneous indication of his depth when he is diving, the depth variation indicator hand being at that moment locked at zero, the depth indicator hand being in turn locked when the diver reaches a decompression stop that he has to make and the depth variation indicator hand being released to indicate to the diver any depth variations relative to the decompression stop depth, the depth variation indicator hand being then returned to zero and locked whereas the depth indicator hand is released and again indicates the exact dive depth when the diver resumes his ascent.

SUMMARY OF THE INVENTION

Owing to these features, this invention provides a dive watch which supplies the diver with readings relating to fluctuations in his depth relative to a desired value corresponding to the depth of the decompression stop that he has to make. When he sees the depth variation indicator hand oscillate on either side of a zero value, the diver can thus, at a glance, see that he is actually ascending or descending relative to the depth level of the decompression stop that it is imperative for him to respect and he can then move upwards or downwards in order to achieve stability at the required depth. In doing so, the diver ensures that he performs the decompression stop in optimum conditions prior to resuming his ascent, which substantially improves the safety of said diver.

According to a complementary feature of the invention, during dives, the pressure sensor causes the rotation of an input wheel of a differential gear mechanism, a first output of which formed by a depth variation wheel set carrying the depth variation indicator hand, is locked, such that a second output of the differential gear mechanism formed by a depth wheel set carrying the depth indicator hand rotates whereas, during a decompression stop, the depth wheel set is locked and the depth variation wheel set is free and rotates, the depth variation wheel set again being locked and the depth wheel set again begin free to rotate when the diver has finished his decompression stop and resumes his ascent to the surface.

Owing to these other features, this invention provides a dive watch fitted with a simple and robust differential gear mechanism which operates reliably.

BRIEF DESCRIPTION OF THE DRAWINGS

Other features and advantages of this invention will appear more clearly from the following detailed description of an embodiment of the dive watch according to the invention, this example being given purely by way of non-limiting illustration with reference to the annexed drawing, in which.

DETAILED DESCRIPTION OF THE ILLUSTRATIVE EMBODIMENTS

This invention proceeds from the general inventive idea, which consists in fitting a dive watch with a depth variation indicator device that enables the diver to see, at a glance, whether or not he is remaining stable at the depth required for the decompression stop that he is making and, if necessary, allowing him to move up or down again in order to return to the required depth. Therefore, the more the diver is able to observe the depth of the decompression stop, the more efficient the decompression stop, and thus elimination of nitrogen from the diver's body, will be. The dive watch according to the invention can thus substantially increase the safety of the diver.

Figure 1:
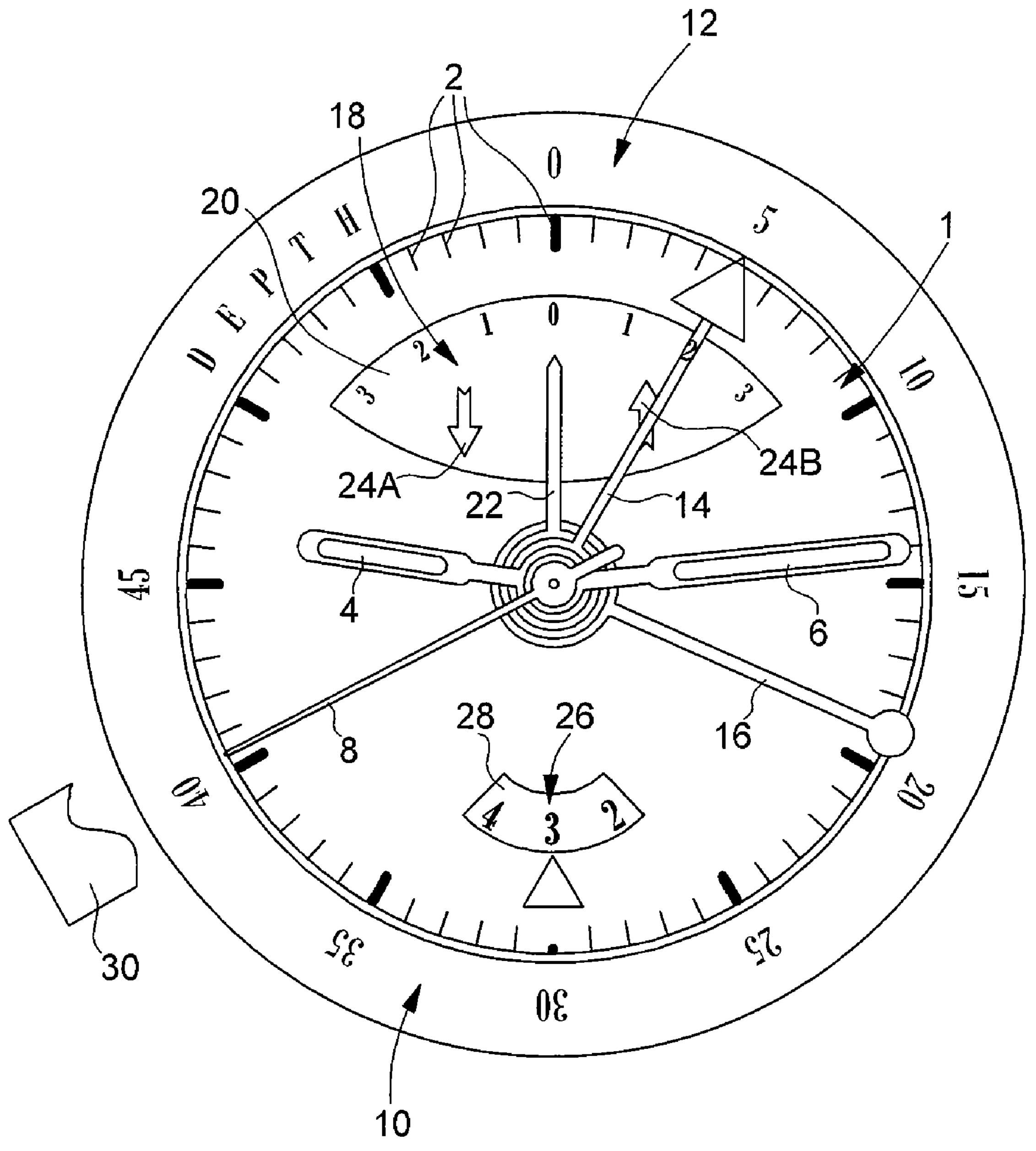
FIG. 1 is a plan view of the dial of the dive watch according to the invention, showing the depth indicator hand and the depth variation indicator hand.

FIG. 1 is a plan view of a dial of a dive watch according to the invention. Designated as a whole by the general reference numeral 1, this main dial has hour and minute symbols 2 on its external periphery. A set of hands, formed of hour hand 4, minute hand 6 and seconds hand 8 is arranged at the centre of dial 1, and moves in a conventional manner above the dial. Dial 1 is surrounded by a bezel 10 on which a scale of depths 12 is affixed. In the example shown in the drawing, the scale is graduated in steps of five meters. A depth indicator hand 14, whose role will be explained in detail below, cooperates with depth scale 12 to give the diver an instantaneous reading of his current depth. By way of non-essential accessory, the dive watch according to the invention further includes a hand 16, which is driven by depth indicator hand 14 and which indicates the maximum depth attained by the diver during his dive.

A dial 18 of smaller dimensions, which carries a depth variation scale 20, graduated in meters and centred on zero, is arranged on main dial 1. A depth variation indicator hand 22, whose role will be explained in detail below, cooperates with depth variation scale 20 to indicate to the diver any fluctuations in depth relative to the depth level required for the decompression stop that he has to make. In order to indicate depth variations to the diver, a first solution could consist in graduating the scale for example between −3 meters and +3 meters, with a negative depth value meaning that the diver is below the decompression stop depth, whereas the positive value would tell the diver that he is above the decompression stop depth. According to another variant, which is shown in the drawing, depth variation scale 20 extends, when read in the clockwise direction, between "3" and "0" and between "0" and "3". It is completed by two arrows 24A and 24B, which point respectively downwards and upwards and which tell the diver that he is below or above the decompression stop level by a value given by reading the figure on scale 20 to which hand 22 is pointing.

An aperture 26 through which the figures of a five-minute counter 28 pass, is arranged on main dial 1.

Finally, the dive watch according to the invention includes a push-button 30 whose role will be described in detail below.

It will be noted that the set of hands formed by hour hand 4, minute hand 6 and seconds hand 8, depth indicator hand 14, hand 16 indicating the maximum dive depth and depth variation indicator hand 22 are mounted coaxially at the centre of dial 1.

In FIG. 1, dial 1 of the dive watch according to the invention provides the following information: the diver has been at a decompression depth of five meters for three minutes, the maximum dive depth that he attained during his dive is nineteen meters and the deviation from the decompression depth is zero.

Figure 2A:
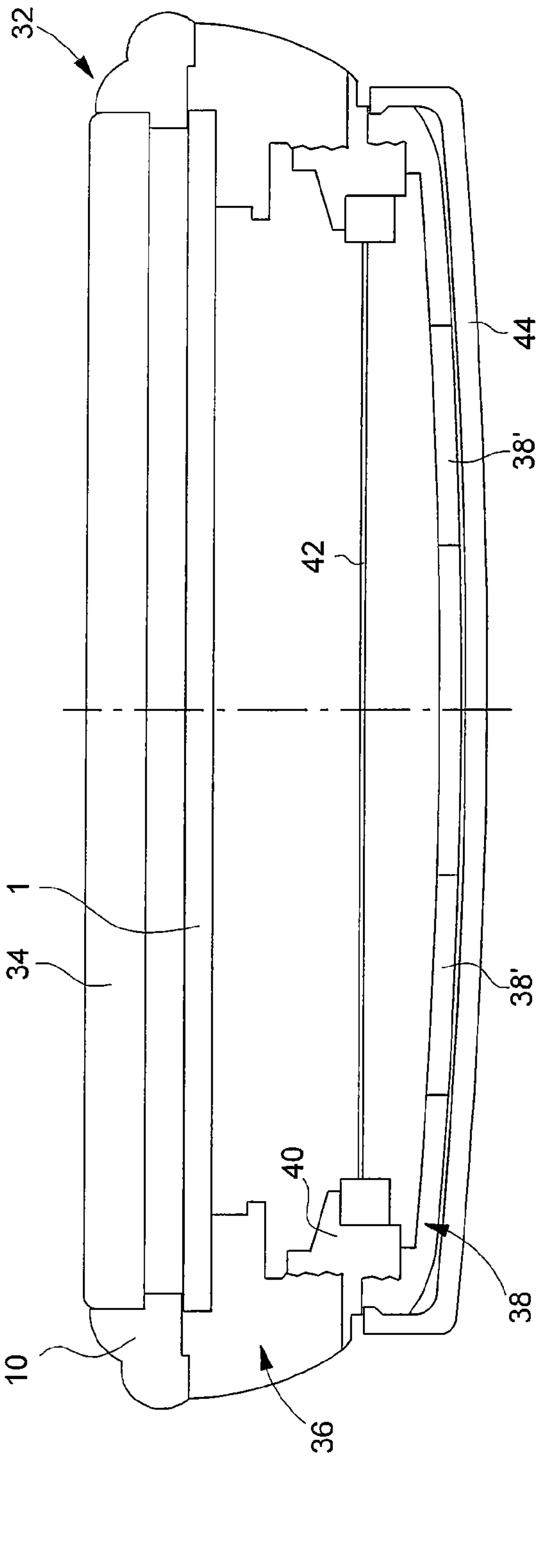
FIG. 2A is a cross-section of the watchcase shown in FIG. 1 before the dive watch is switched on, i.e. in the open air.

FIG. 2A is a cross-section of the case of the dive watch according to the invention prior to use, i.e. in the open air. Essentially, this watchcase, designated as a whole by the general reference numeral 32, is formed of the aforementioned bezel 10, which carries a crystal 34 below which dial 1 extends at a distance. This set of parts is secured to a middle part 36. A back cover 38 is screwed onto an intermediate part 40, which is itself screwed in a sealed manner to middle part 36. Moreover, this intermediate part 40 carries a pressure sensor 42. Pressure sensor 42 is a sensor which is capable of being mechanically deformed under the effect of pressure. It may be, for example, a membrane sensor as shown in FIG. 2A or a Bourdon tube sensor.

Back cover 38 has a plurality of apertures 38' through which water can pass to come into contact with pressure sensor 42. However, when the watch is in the open air, it is preferable to protect sensor 42 by means of a protection container 44 that is, for example snapped onto back cover 38.

Figure 2B:
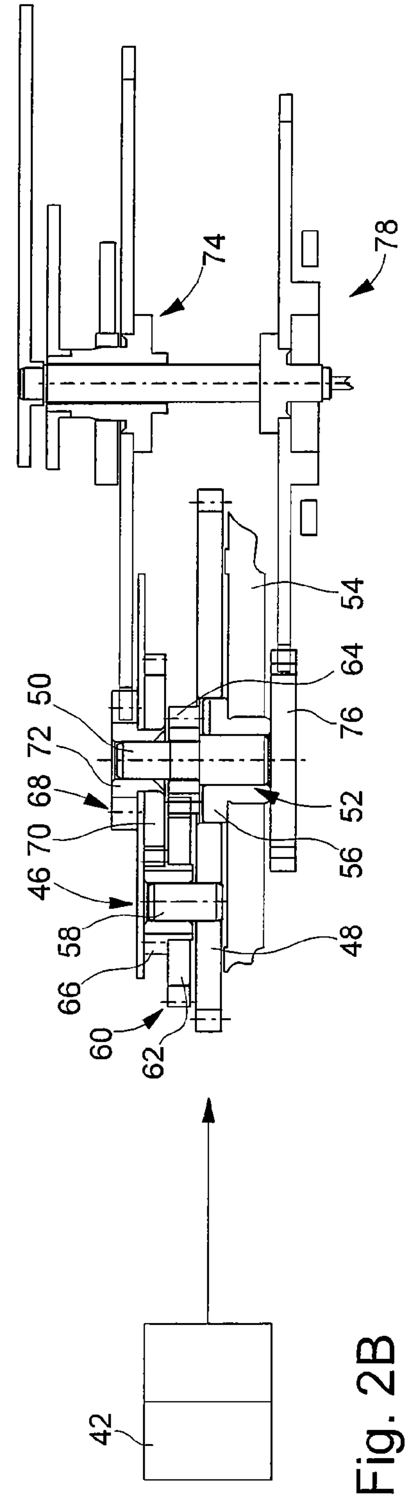
FIG. 2B is a cross-section of the differential gear mechanism fitted to the dive watch according to the invention before the latter is switched on, i.e. in the open air.

FIG. 2B is a cross-section of the differential gear mechanism fitted to the dive watch according to the invention before said watch is switched on, i.e. in the open air. This differential gear mechanism, designated as a whole by the general reference numeral 46, essentially includes a differential input wheel 48, which can be driven in rotation by pressure sensor 42, when the latter is deformed under the effect of a pressure difference between the side of said sensor 42 in contact with the water and the side thereof in contact with the air enclosed in case 32 of the dive watch according to the invention. In the case of FIG. 2B, the watch is in the open air. The pressure is thus identical on either side of pressure sensor 42, such that the latter is stationary and thus does not drive differential input wheel 48 in rotation. In this situation, depth indicator hand 14 points to the "0" of depth scale 12 and depth variation indicator hand 22 is positioned at the centre of depth variation scale 20.

Differential input wheel 48 is mounted to rotate freely on a differential arbour 50 via a stepped bush 52, which is held in axial abutment on a bridge 54 of the movement via the shoulder 56 thereof. An arbour 58 driven into the differential input wheel 48 carries a planetary wheel set 60, whose wheel 62 meshes with a pinion 64 driven onto differential arbour 50 and whose pinion 66 meshes with an intermediate wheel set 68 formed of a wheel 70 and a pinion 72 mounted to rotate freely on differential arbour 50. Pinion 72 meshes in turn with a depth variation wheel set 74 whose structure will be described in detail below.

Differential mechanism 46 includes, finally, a differential output wheel 76, which may be integral with differential arbour 50 or driven onto the latter and which meshes with a depth indicator wheel set 78 whose structure will be described in detail below.

Figure 3A:
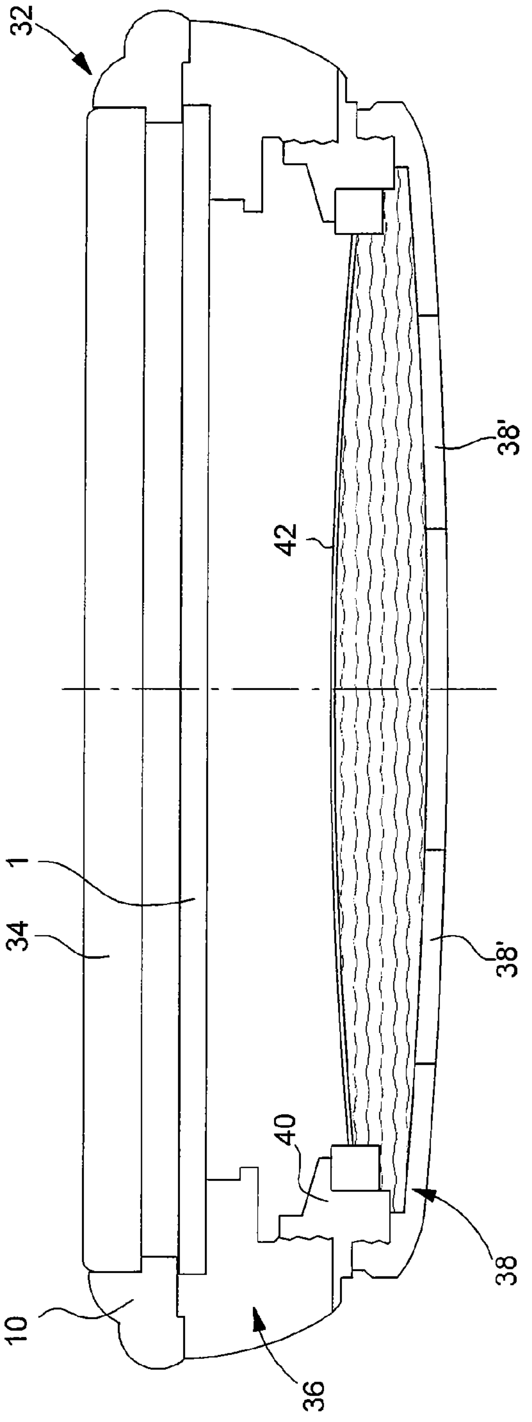
FIGS. 3A and 3B are similar cross-sections to those of FIGS. 2A and 2B respectively, with the diver in the process of making an underwater dive.
Figure 3B:
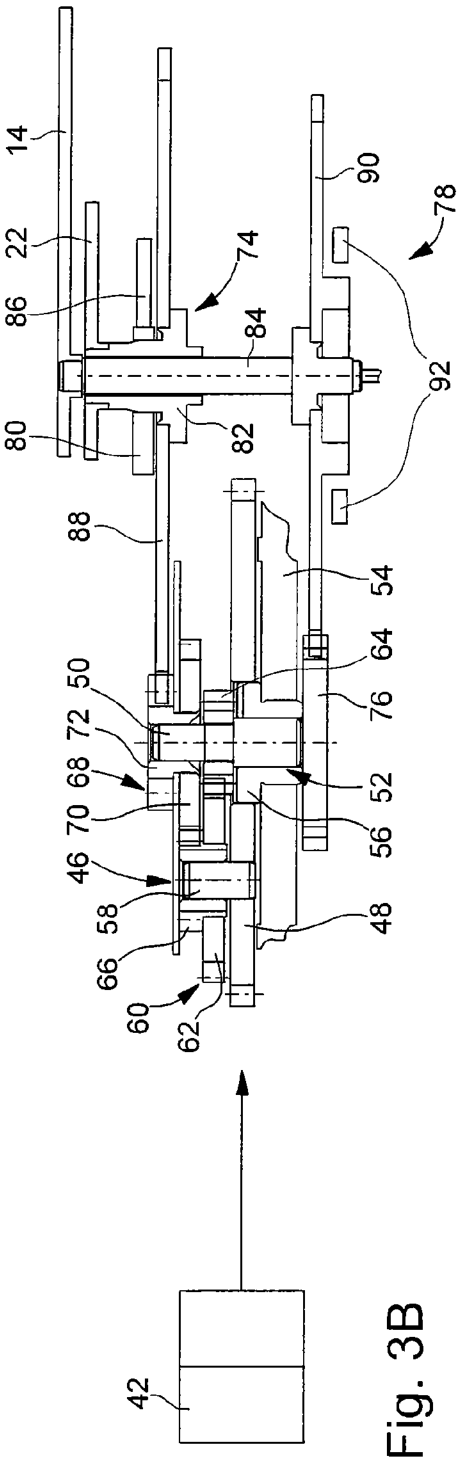

We will now refer to FIGS. 3A and 3B which show the state of the watch according to the invention while the diver is making a dive. It will be noted in FIG. 3A that protective container 44 has been removed, so that water can pass through the apertures 38' made in back cover 38 of dive watch case 32. At this moment, the pressure on either side of pressure sensor 42 is not balanced, so that the sensor deforms mechanically. While deforming, said pressure sensor 42 drives in rotation input wheel 48 of differential mechanism 46 which starts to rotate about differential arbour 50. While rotating, differential input wheel 48 drives with it arbour 58, which carries planetary wheel set 60. While the diver is performing his dive, depth variation wheel set 74 is locked. In fact, depth variation wheel set 74 is made of up of a heart piece 80 driven onto an arbour 82 mounted to rotate freely on an arbour 84 and onto one end of which depth variation indicator hand 22 is driven. Since, at this stage of the dive, heart piece 80 is held immobile by retaining means such as a hammer 86, arbour 82 is locked. But depth variation wheel set 74 also includes a depth variation wheel 88 which is driven onto arbour 82 and which meshes with pinion 72 of intermediate wheel set 68. Thus, since arbour 82 is locked, depth variation wheel 88 is also locked, as is pinion 72 and wheel 70. Consequently, planetary wheel 62 will drive in rotation differential output wheel 76 via differential arbour 50 and pinion 64. In turn, differential output wheel 76 will drive in rotation depth indicator wheel set 78, which is formed of a depth indicator wheel 90 driven onto arbour 84 and means 92 for locking wheel 90, such as a clamp. These locking means 92 are able to lock depth indicator wheel 90. However, in the situation illustrated in FIG. 3B, this wheel 90 is free to rotate such that, driven by differential output wheel 76, it drives arbour 84 and thus depth indicator hand 14. This hand 14 thus moves opposite depth scale 12 and instantaneously gives the diver the value of the depth at which he is situated. During this time, depth variation indicator hand 22 remains immobile, centred on depth variation scale 20.

Figure 4A:
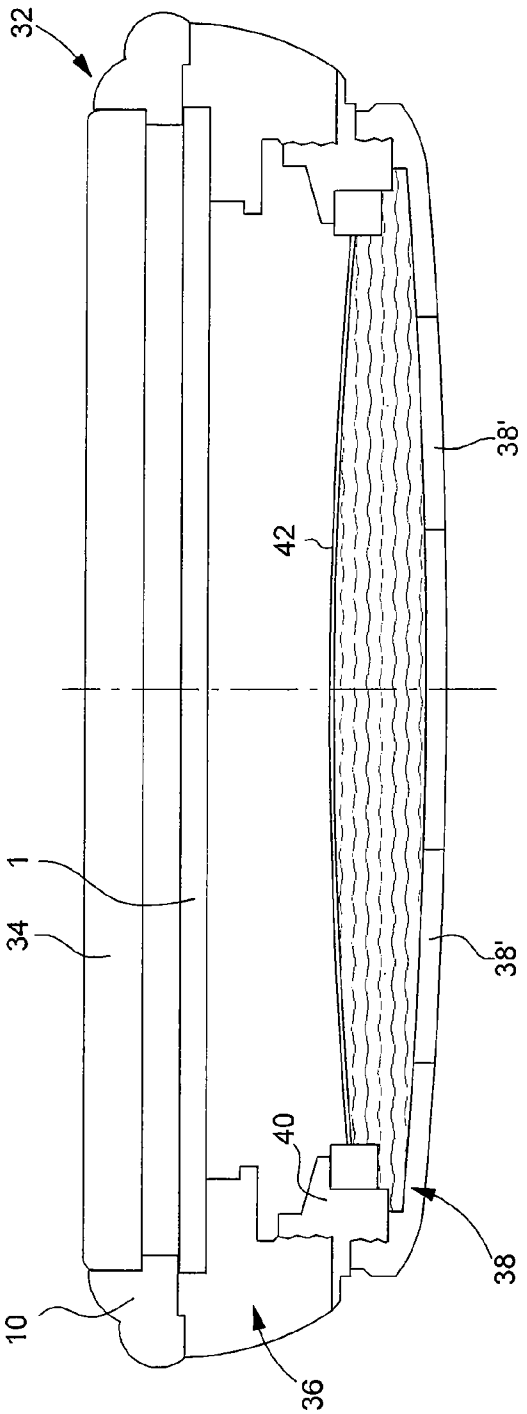
FIGS. 4A and 4B are similar cross-sections to those of FIGS. 3A and 3B respectively, with the diver in the process of making a decompression stop.
Figure 4B:
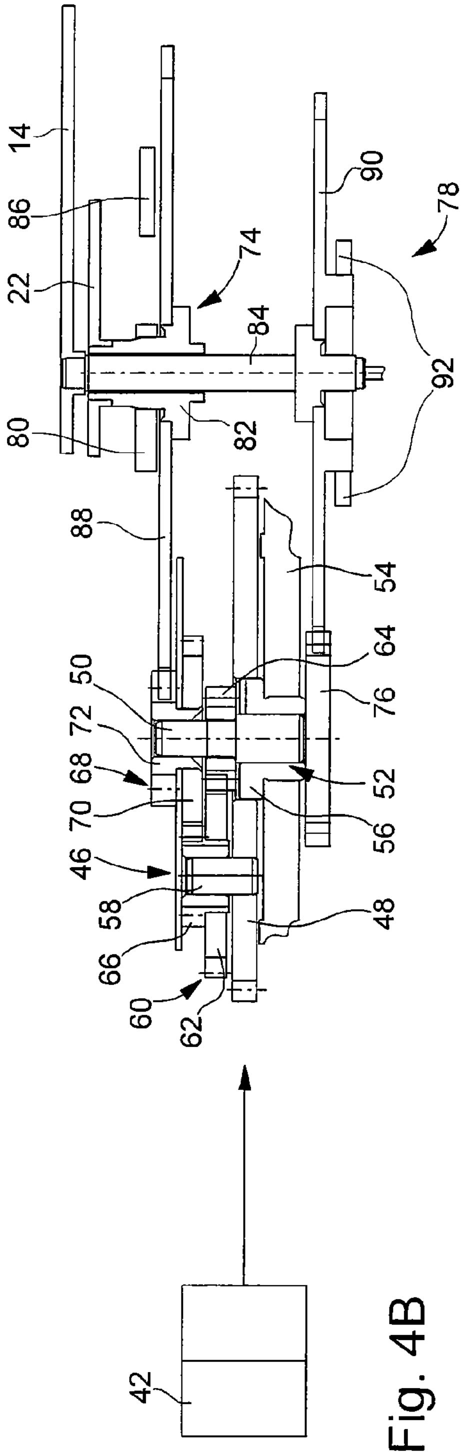

We reference to FIGS. 4A and 4B, we will now examine the case in which the diver has to make a decompression stop. The diver starts his ascent and interrupts his upward movement when depth indicator hand 14 tells him that he has reached at the depth of the decompression level that he has to perform. Once he has arrived at that depth, the diver presses on pushbutton 30. Under the effect of this pressure, hammer 86 moves away from heart piece 80, while clamp 92 moves to immobilise the depth indicator wheel 90. Thus, depth indicator hand 14 will remain fixed relative to depth scale 12 while depth variation indicator hand 22 will oscillate on either side of the centre of depth variation scale 12 as a function of fluctuations in the diver's depth. In fact, depending upon whether the diver is above or below the decompression stop depth, pressure sensor 42 will deform mechanically, driving in rotation differential input wheel 48. Since depth indicator wheel 30 is locked, differential output wheel 76, differential arbour 50 and pinion 64 are also locked. Consequently, planetary pinion 66 will drive depth variation wheel 88 in rotation via intermediate wheel 68. This wheel 88 will be allowed to rotate as hammer 86 is no longer locking heart piece 80 and thus arbour 82 onto which heart piece 80 is driven, such that depth variation indicator hand 22 will be able to rotate.

When the diver has completed his decompression stop, he can resume his ascent towards the surface. At that moment, he will again press on pushbutton 30. Under the effect of that pressure, clamp 92 will again move away from depth indicator wheel 90, again allowing depth indicator hand 14 to rotate, while hammer 86 will again lock heart piece 80 and thus depth variation indicator hand 22. When hammer 86 falls onto heart piece 80, it allows said hand 22 to reposition itself at the centre of dial 18 which carries depth variation indicator scale 20. At the same time, the rotation of differential input wheel 48 will be transmitted, via planetary wheel 62, pinion 64 and differential output wheel 76 to depth indicator wheel 90, readjusting said depth indicator wheel to the exact dive depth.

It goes without saying that this invention is not limited to the embodiment that has just been described and that various simple alterations and variants could be envisaged by those skilled in the art without departing from the scope of the invention as defined by the claims annexed to this Patent Application. In particular, one could envisage switching on five-minute counter 28 to accompany the action on pushbutton 30 at the moment when the diver starts his decompression stop. Moreover, the transmission of the pressure exerted by the diver on pushbutton 30 to heart piece 80 and to clamp 92 occurs in a conventional manner via levers and/or intermediate wheels which are well known to those skilled in the art and which therefore require no further description here.

The invention claimed is:

1. A mechanical or electromechanical dive watch including hour and minute hands and a pressure sensor, wherein it further includes a depth indicator hand and a depth variation indicator hand, the depth indicator hand providing the diver with an indication of the instantaneous value of the depth at which he is situated when he is diving, the depth variation indicator hand being at that moment locked at zero, the depth indicator hand being locked in turn when the diver reaches a required decompression stop and the depth variation indicator hand being released to indicate to the diver any variations in his depth relative to the decompression stop depth, the depth variation indicator hand then being returned to zero and locked while the depth indicator hand is released and again indicates the exact dive depth when the diver resumes his ascent towards the surface.

2. The dive watch according to claim 1, wherein the depth indicator hand and the depth variation indicator hand are alternately locked then released via pressure on a single pushbutton.

3. The dive watch according to claim 2, wherein activation of the push button stops and starts a time counter.

4. The dive watch according to claim 1, wherein, during dives, the pressure sensor causes the rotation of an input wheel of a differential gear mechanism a first output of which, formed by a depth variation wheel set carrying the depth variation indicator hand is locked, such that a second output of the differential gear mechanism formed by a depth indicator wheel set carrying the depth indicator hand rotates whereas, during a decompression stop, the depth indicator wheel set is locked and the depth variation wheel set is free and rotates, the depth variation wheel set being locked again and the depth indicator wheel set being free to rotate again when the diver has finished his decompression stop and resumes his ascent towards the surface.

5. The dive watch according to claim 2, wherein, during dives, the pressure sensor causes the rotation of an input wheel of a differential gear mechanism a first output of which, formed by a depth variation wheel set carrying the depth variation indicator hand is locked, such that a second output of the differential gear mechanism formed by a depth indicator wheel set carrying the depth indicator hand rotates whereas, during a decompression stop, the depth indicator wheel set is locked and the depth variation wheel set is free and rotates, the depth variation wheel set being locked again and the depth indicator wheel set being free to rotate again when the diver has finished his decompression stop and resumes his ascent towards the surface.

6. The dive watch according to claim 3, wherein, during dives, the pressure sensor causes the rotation of an input wheel of a differential gear mechanism a first output of which, formed by a depth variation wheel set carrying the depth variation indicator hand is locked, such that a second output of the differential gear mechanism formed by a depth indicator wheel set carrying the depth indicator hand rotates whereas, during a decompression stop, the depth indicator wheel set is locked and the depth variation wheel set is free and rotates, the depth variation wheel set being locked again and the depth indicator wheel set being free to rotate again when the diver has finished his decompression stop and resumes his ascent towards the surface.

7. The dive watch according to claim 4, wherein the depth variation wheel set includes a heart piece (80) fixedly mounted on an arbour which is itself mounted to rotate freely on an arbour and on one end of which the depth variation indicator hand is fixedly mounted, said heart piece being able to be locked or released by retaining means, and wherein the depth indicator wheel set includes a depth indicator wheel fixedly mounted on the arbour and means for locking said wheel, the depth indicator hand being fixedly mounted on one end of the arbour.

8. The dive watch according to claim 5, wherein the depth variation wheel set includes a heart piece (80) fixedly mounted on an arbour which is itself mounted to rotate freely on an arbour and on one end of which the depth variation indicator hand is fixedly mounted, said heart piece being able to be locked or released by retaining means, and wherein the depth indicator wheel set includes a depth indicator wheel fixedly mounted on the arbour and means for locking said wheel, the depth indicator hand being fixedly mounted on one end of the arbour.

9. The dive watch according to claim 6, wherein the depth variation wheel set includes a heart piece (80) fixedly mounted on an arbour which is itself mounted to rotate freely on an arbour and on one end of which the depth variation indicator hand is fixedly mounted, said heart piece being able to be locked or released by retaining means, and wherein the depth indicator wheel set includes a depth indicator wheel fixedly mounted on the arbour and means for locking said wheel, the depth indicator hand being fixedly mounted on one end of the arbour.

10. The dive watch according to claim 7, wherein the retaining means include a hammer and wherein the locking means include a clamp.

11. The dive watch according to claim 8, wherein the retaining means include a hammer and wherein the locking means include a clamp.

12. The dive watch according to claim 9, wherein the retaining means include a hammer and wherein the locking means include a clamp.

13. The dive watch according to claim 4, wherein the differential input wheel is mounted to rotate freely on a differential arbour and carries a planetary wheel set which meshes on the one hand with a pinion mounted freely on the differential arbour and which meshes in turn with the depth variation wheel set, a differential output wheel secured to said differential arbour meshing with the depth indicator wheel set.

14. The dive watch according to claim 5, wherein the differential input wheel is mounted to rotate freely on a differential arbour and carries a planetary wheel set which meshes on the one hand with a pinion mounted freely on the differential arbour and which meshes in turn with the depth variation wheel set, a differential output wheel secured to said differential arbour meshing with the depth indicator wheel set.

15. The dive watch according to claim 6, wherein the differential input wheel is mounted to rotate freely on a differential arbour and carries a planetary wheel set which meshes on the one hand with a pinion mounted freely on the differential arbour and which meshes in turn with the depth variation wheel set, a differential output wheel secured to said differential arbour meshing with the depth indicator wheel set.

16. The dive watch according to claim 7, wherein the differential input wheel is mounted to rotate freely on a differential arbour and carries a planetary wheel set which meshes on the one hand with a pinion mounted freely on the differential arbour and which meshes in turn with the depth variation wheel set, a differential output wheel secured to said differential arbour meshing with the depth indicator wheel set.

17. The dive watch according to claim 8, wherein the differential input wheel is mounted to rotate freely on a differential arbour and carries a planetary wheel set which meshes on the one hand with a pinion mounted freely on the differential arbour and which meshes in turn with the depth variation wheel set, a differential output wheel secured to said differential arbour meshing with the depth indicator wheel set.

18. The dive watch according to claim 9, wherein the differential input wheel is mounted to rotate freely on a differential arbour and carries a planetary wheel set which meshes on the one hand with a pinion mounted freely on the differential arbour and which meshes in turn with the depth variation wheel set, a differential output wheel secured to said differential arbour meshing with the depth indicator wheel set.

19. The dive watch according to claim 10, wherein the differential input wheel is mounted to rotate freely on a differential arbour and carries a planetary wheel set which meshes on the one hand with a pinion mounted freely on the differential arbour and which meshes in turn with the depth variation wheel set, a differential output wheel secured to said differential arbour meshing with the depth indicator wheel set.

* * * * *